United States Patent
Inoue (10) Patent No.: US 10,819,877 B2
(45) Date of Patent: Oct. 27, 2020

(54) PRINTING APPARATUS, PRINTING APPARATUS CONTROL METHOD, AND STORAGE MEDIUM CONNECTING TO AN OPTION UNIT UPDATE OPTION UNIT PROGRAM USING AN UPDATE PROGRAM STORED A STORAGE

(71) Applicant: CANON KABUSHIKI KAISHA, Tokyo (JP)

(72) Inventor: Katsuhiro Inoue, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/864,431

(22) Filed: Jan. 8, 2018

(65) Prior Publication Data
US 2018/0131835 A1 May 10, 2018

Related U.S. Application Data

(63) Continuation of application No. 14/019,345, filed on Sep. 5, 2013, now Pat. No. 9,866,723.

(30) Foreign Application Priority Data

Sep. 7, 2012 (JP) ................................ 2012-197555

(51) Int. Cl.
*H04N 1/32* (2006.01)
*H04N 1/23* (2006.01)

(52) U.S. Cl.
CPC ........... *H04N 1/32101* (2013.01); *H04N 1/23* (2013.01); *H04N 1/32* (2013.01)

(58) Field of Classification Search
None
See application file for complete search history.

(56) References Cited

U.S. PATENT DOCUMENTS

| 2004/0184063 A1* | 9/2004 | Baldwin | G06F 3/1234 |
| | | | 358/1.13 |
| 2006/0023251 A1* | 2/2006 | Petteruti | B41J 3/36 |
| | | | 358/1.15 |
| 2010/0169877 A1* | 7/2010 | Ackerman | G06F 8/65 |
| | | | 717/171 |
| 2013/0301069 A1* | 11/2013 | Yanagi | G06F 3/1285 |
| | | | 358/1.13 |

FOREIGN PATENT DOCUMENTS

| JP | 2001-216167 A | 8/2001 |
| JP | 2005-196402 A | 7/2005 |
| JP | 2011-015382 A | 1/2011 |

OTHER PUBLICATIONS

English Translation of Kato Takeshi, JP 2001-216167 (Year: 2001).*

* cited by examiner

*Primary Examiner* — Mohammad H Ghayour
*Assistant Examiner* — Pawan Dhingra
(74) *Attorney, Agent, or Firm* — Canon U.S.A., Inc. IP Division (57) ABSTRACT

A printing apparatus to which an option unit can be connected includes a storage unit configured to store an update program for updating an option unit program, and an update unit configured to, if an option unit has been connected to the printing apparatus, update the option unit program using an update program stored by the storage unit.

13 Claims, 7 Drawing Sheets

OPTION UNIT SELECTION SCREEN

SELECT OPTION UNIT THAT DOES NOT HAVE LATEST PROGRAM.

- ☐ FACSIMILE UNIT
- ☑ FOLDING MACHINE UNIT
- ☐ PUNCH UNIT
- ☐ SADDLE STITCH BINDING UNIT

PRINTING APPARATUS, PRINTING APPARATUS CONTROL METHOD, AND STORAGE MEDIUM CONNECTING TO AN OPTION UNIT UPDATE OPTION UNIT PROGRAM USING AN UPDATE PROGRAM STORED A STORAGE

CROSS-REFERENCE TO RELATED APPLICATIONS

This application is a continuation, and claims the benefit, of U.S. patent application Ser. No. 14/019,345 filed Sep. 5, 2013, which claims the benefit of Japanese Patent Application No. 2012-197555, filed Sep. 7, 2012. Each of U.S. patent application Ser. No. 14/019,345 and Japanese Patent Application No. 2012-197555 is hereby incorporated by reference herein in its entirety.

BACKGROUND OF THE INVENTION

Field of the Invention

The present invention relates to a printing apparatus, a printing apparatus control method, and a storage medium.

Description of the Related Art

An image forming apparatus, such as a multifunction peripheral, includes a central processing unit (CPU) of a main body controller unit that controls the entire image forming apparatus, and option unit CPUs that individually control option functions, such as a FAX and a folding machine function. The various functions, such as the FAX and the folding machine function, are realized by the option unit CPUs operating based on control programs corresponding to the respective functions, stored in a storage device such as a read-only memory (ROM).

Conventionally, when trying to utilize an option function, a service person has had to mount the option unit and update the control programs of a combination of the option units matching the version of the control programs in the main body. Japanese Patent Application Laid-Open No. 2008-116660 discusses a technology for updating option unit control programs. In this technology, the main body controller compares the version of the control program in an option unit with the version of that control program on a server. If the option unit version is older, the main body controller downloads the option unit control program on the server, and then downloads that control program to the option unit.

An option unit like a facsimile board can be used as an option unit that is common to a plurality of models. For easier inventory management, such an option unit is handled as the identical unit stock number (unit+control program).

However, the option unit control program is frequently corrected in order to respond to the various problems that arise when producing a new model, which naturally means that the program version also increases each time a correction is made. In this case, after the new version has finished being evaluated for the plurality of models, the option unit program for the models that have already been brought to market needs to be downloaded.

When utilizing an option function for the first time, the service person first mounts the option unit on the main body. However, if left like this, since the option unit is managed based on the identical stock number, the version of the control program in the option unit will often be old. According to the technology discussed in Japanese Patent Application Laid-Open No. 2008-116660, in this case, the option unit control program has had to be updated after accessing the server and downloading the option unit program to the main body. Further, it is also necessary to determine on the main body side whether the option unit control program corresponds to the version of the main body control program.

SUMMARY OF THE INVENTION

The present invention is directed to a easily preventing the occurrence of problems caused by mismatch in the program version between a main body and an option unit.

According to an aspect of the present invention, a printing apparatus, to which an option unit can be connected, includes a storage unit configured to store an update program for updating an option unit program, and an update unit configured to, if an option unit has been connected to the printing apparatus, update the option unit program using an update program stored by the storage unit.

Further features and aspects of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

A first exemplary embodiment will now be described.

An exemplary embodiment of the present invention will be described below with reference to the drawings.

Figure 1:
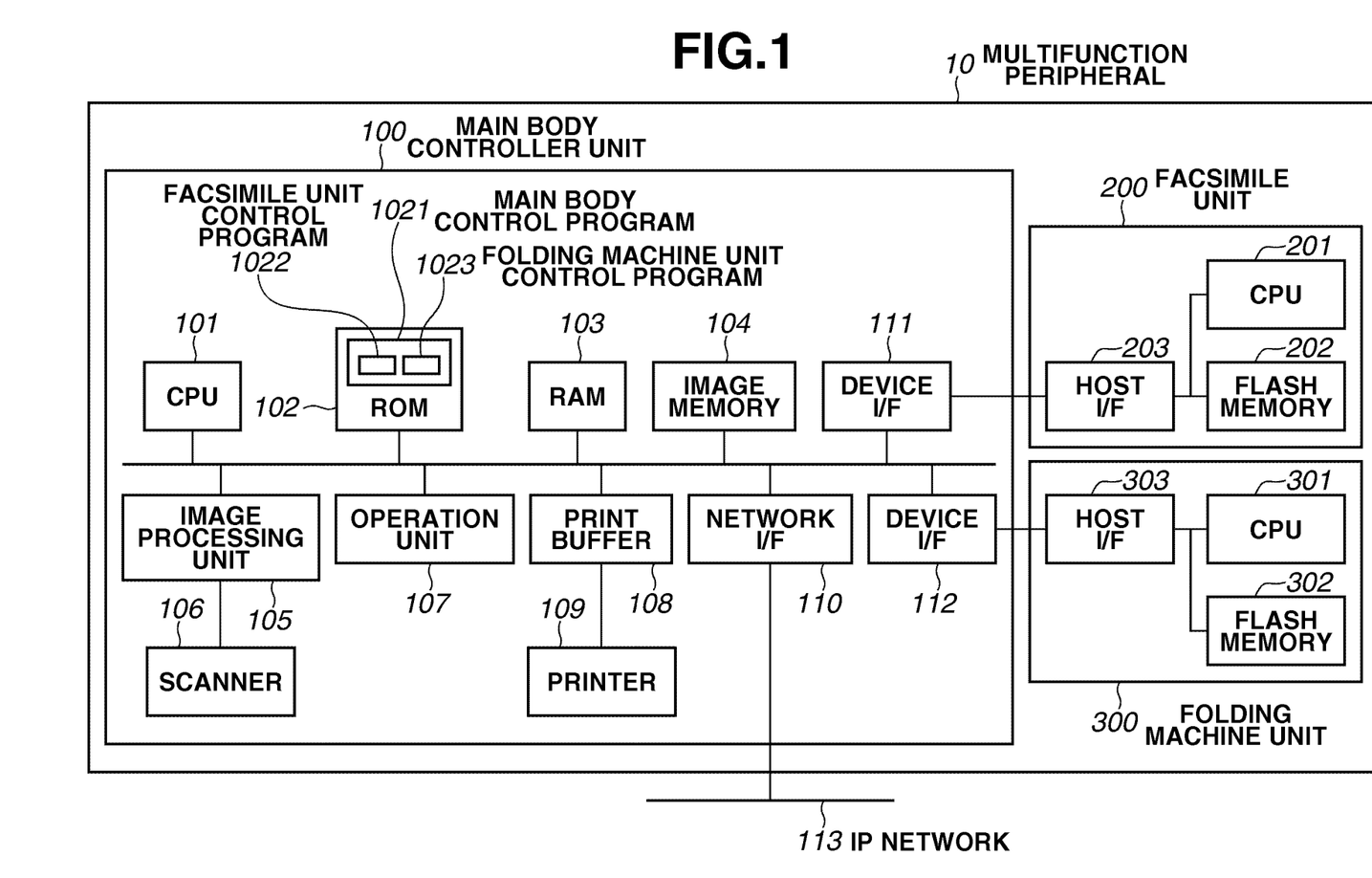
FIG. 1 illustrates an example of a hardware configuration of a multifunction peripheral.

FIG. 1 illustrates an example of a hardware configuration of a multifunction peripheral 10.

The multifunction peripheral 10 includes a facsimile unit 200 and a folding machine unit 300 as option units in addition to a main body controller unit 100. These option units are detachable from the multifunction peripheral 10 main body. The multifunction peripheral 10 realizes various functions by CPUs of the main body controller unit and the option units operating in cooperation with each other. The CPU in the main body controller unit of the multifunction peripheral 10 is connected to the CPU of each option unit via a device interface (I/F). A control program describing the content to be processed by the CPU in the respective option units is stored in a rewritable non-volatile memory (flash memory) of each option unit.

The main body controller unit 100 is configured from the following constituent elements.

A CPU 101, which is a system control unit, controls the entire apparatus. A ROM 102 is a rewritable non-volatile memory that stores CPU control programs. A random-access memory (RAM) 103, which is configured from a static-RAM (SRAM), for example, stores image data. An image memory 104, which is configured from a dynamic-RAM (DRAM), for example, stores image data. An image processing unit 105 performs correction processing on image data read by a scanner, and outputs high-definition image data. A scanner 106 is configured from a CS image sensor, a document conveyance mechanism and the like, optically reads a document and converts the read document into electrical image data. The scanner 106 performs two-sided document reading. An operation unit 107, which is configured from a keyboard and a display unit, allows an operator to perform various input operations. A print buffer 108 is a one page's worth buffer memory for storing a printing character code. A printer 109 is, for example, a laser beam printer (LBP) that records a received image or file data on plain paper. The printer 109 can perform two-sided recording. A network I/F 110 controls a network. A device I/F 111 controls the facsimile unit. A device I/F 112 controls the folding machine unit. An Internet protocol (IP) network 113 is a network such as the Internet, for example.

Option unit control programs are stored in the ROM 102, being embedded in a control program 1021 used by the CPU 101 of the main body controller unit. Specifically, a facsimile unit control program 1022 and a folding machine unit control program 1023 used by the CPUs of the facsimile unit and the folding machine unit, respectively, are embed and stored in the ROM 102. The CPU 101 performs various controls regarding the multifunction peripheral 10 based on a main body controller unit 100 control program. On the other hand, the facsimile unit control program 1022 and the folding machine unit control program 1023 stored in a program update area of the ROM 102 are downloaded into the facsimile unit and the folding machine unit, respectively. The facsimile unit 200 includes a CPU 201, a rewritable non-volatile memory 202 (flash memory) storing that control program, and a host I/F 203. The host I/F 203 of the facsimile unit 200 is connected to the device I/F 111 of the main body controller unit 100. The folding machine unit 300 includes a CPU 301, a rewritable non-volatile memory 302 (flash memory) storing that control program, and a host I/F 303. The host I/F 303 in the folding machine unit 300 is connected to the device I/F 112 of the main body controller unit 100.

Although the following exemplary embodiment, which includes the present exemplary embodiment, is described such that the main body control program includes the option unit control programs, the following exemplary embodiment is not limited to this. For example, the multifunction peripheral 10 may be configured to obtain and store a file in which the main body control program and the control programs of the option units that can be connected to the multifunction peripheral 10 constitute a pack. Further, in the present exemplary embodiment, although the facsimile unit 200 and the folding machine unit 300 are described as an example of the option units for ease of description, the option units are not limited to these. For example, examples of other option units include a punch unit and a saddle stitch binding unit, which are described below in other exemplary embodiments. Further, the multifunction peripheral 10 is an example of an image forming apparatus.

Further, in the following, the facsimile unit control program 1022 is also referred to as the control program of the facsimile unit and the folding machine unit control program 1023 is also referred to as the control program of the folding machine unit.

Figure 2:
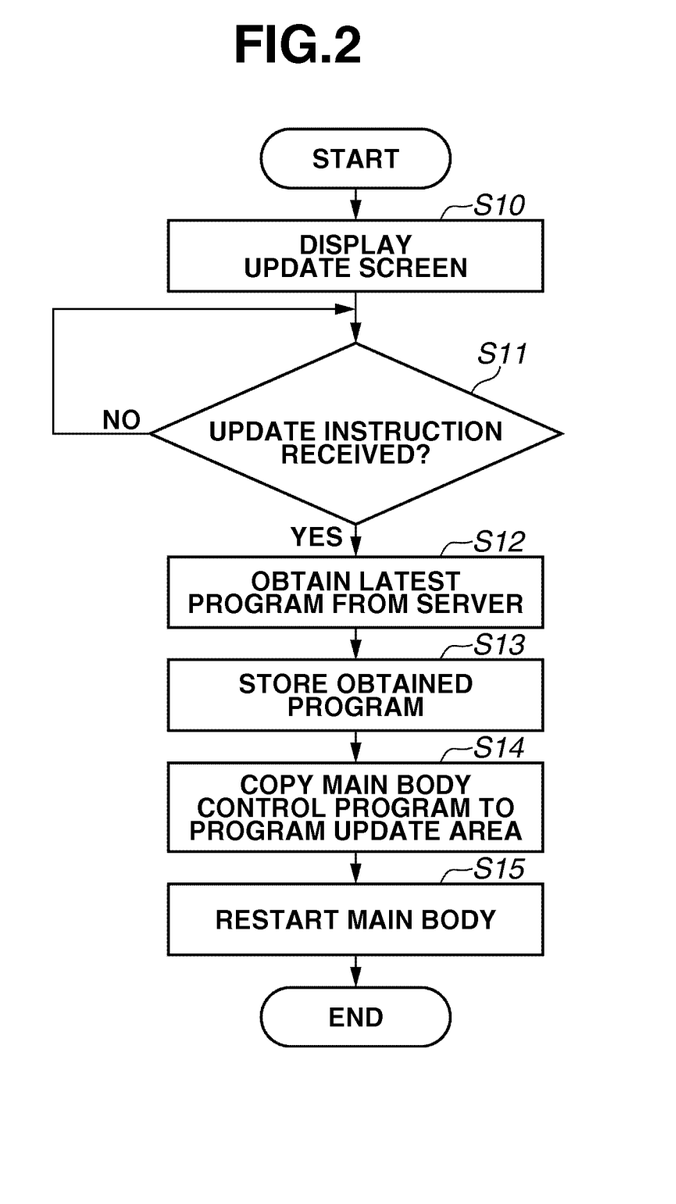
FIG. 2 is a flowchart illustrating an example of processing performed in a multifunction peripheral for obtaining a program from a server.

FIG. 2 is a flowchart illustrating an example of processing performed by the multifunction peripheral 10 for obtaining a program from a server.

In step S10, when a predetermined operation from the user is performed, the CPU 101 displays an update operation screen on the operation unit 107.

In step S11, the CPU 101 determines whether an update instruction has been received from the user via the operation screen. If it is determined by the CPU 101 that an update instruction has been received from the user via the operation screen (YES in step S11), the processing proceeds to step S12. If it is determined by the CPU 101 that an update instruction has not been received from the user via the operation screen (NO in step S11), the CPU 101 repeats the processing of step S11.

In step S12, the CPU 101 obtains the latest main body control program from a server capable of communication via the network. As described above, this main body control program includes the latest control programs of the option units that can be connected to the multifunction peripheral 10. For example, even if the option units connected to the multifunction peripheral 10 include two types of the option units that are a facsimile unit and a folding machine unit, the main body control program still includes the control programs for other option units that are not connected to the multifunction peripheral 10, such as a punch unit and a saddle stitch binding unit.

In step S13, the CPU 101 stores the obtained main body control program in a download area of the ROM 102.

In step S14, the CPU 101 copies the main body control program stored in the download area to a program update area in the ROM 102. Further, the CPU 101 may also be configured to copy only the portion other than the option unit control programs included in the main body control program (i.e., the actual main body control program portion).

In step S15, the CPU 101 restarts the main body of the multifunction peripheral 10.

Figure 3:
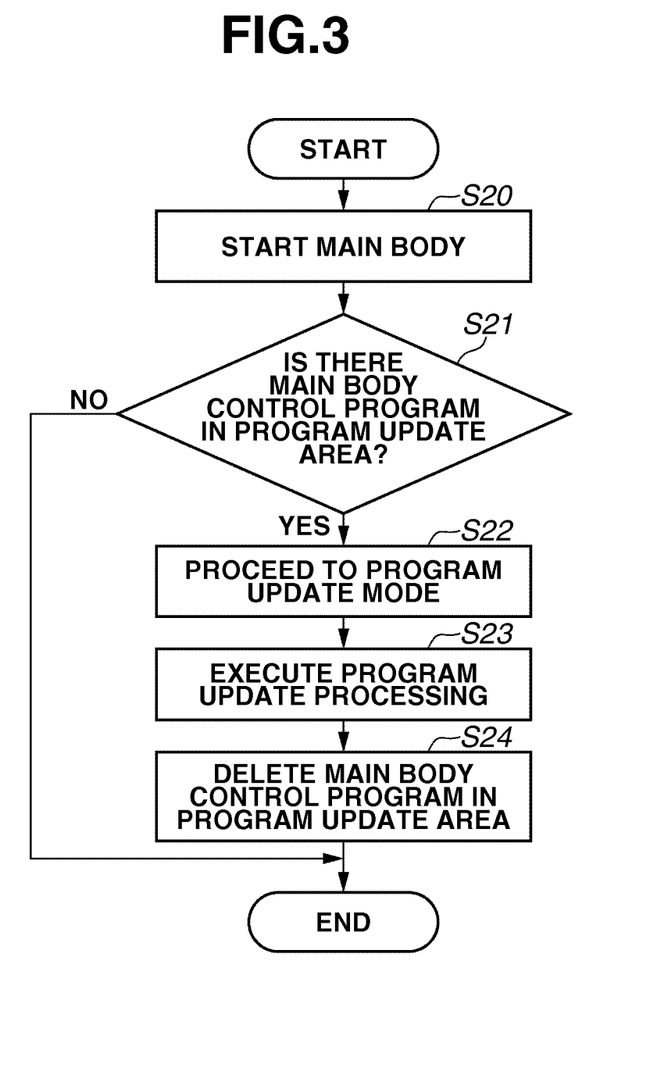
FIG. 3 is a flowchart illustrating an example of update processing of a main body control program performed in a multifunction peripheral.

FIG. 3 is a flowchart illustrating an example of update processing of a main body control program performed by the multifunction peripheral 10. The processing of FIG. 3 is performed following on from step S15 of FIG. 2.

When the main power of the multifunction peripheral 10 main body is turned on, the CPU 101 executes the following processing based on the main body control program stored in a program storage area of the ROM 102. First, in step S20, the CPU 101 starts the main body of the multifunction peripheral 10.

In step S21, the CPU 101 determines whether there is a main body control program in the program update area of the ROM 102. If it is determined by the CPU 101 that there is a main body control program in the program update area of the ROM 102 (YES in step S21), the processing proceeds to step S22. If it is determined by the CPU 101 that there is not a main body control program in the program update area of the ROM 102 (NO in step S21), the processing illustrated in FIG. 3 is finished.

In step S22, the CPU 101 proceeds to a program update mode.

In step S23, the CPU 101 executes update processing to update the main body control program of the multifunction peripheral 10 to the main body control program in the program update area. For example, the CPU 101 replaces the main body control program stored in the program storage area of the ROM 102 with the main body control program in the program update area.

In step S24, the CPU 101 deletes the main body control program in the program update area.

Based on the processing illustrated in FIGS. 2 and 3, the main body control program is updated to the latest main body control program. Further, the multifunction peripheral 10 can store in the download area of the ROM 102 the latest main body control program as well as the latest control programs for the option units that can be connected.

Figure 4:
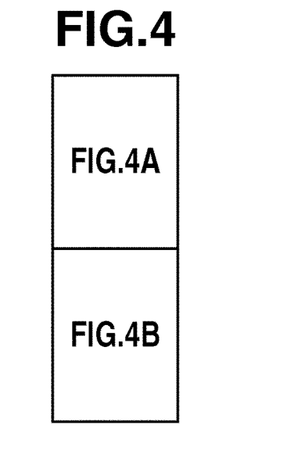
FIG. 4, which is composed of FIGS. 4A and 4B, is a flowchart illustrating an example of update processing of an option unit (facsimile unit, folding machine unit) control program performed in a multifunction peripheral.
Figure 4A:
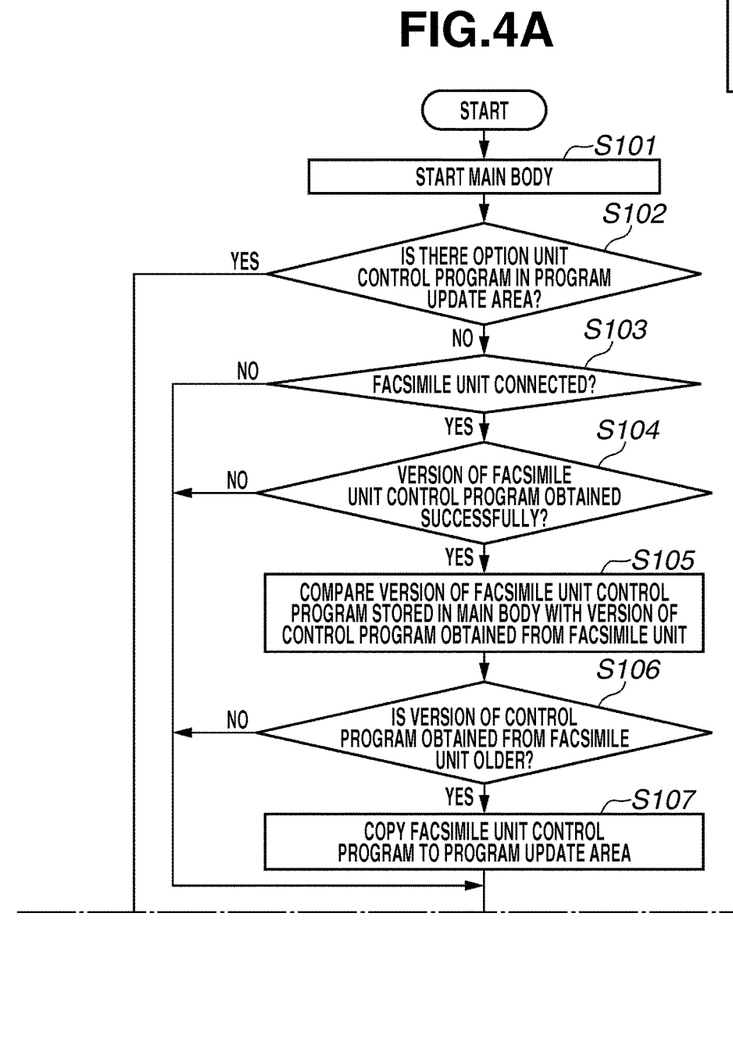
Figure 4B:
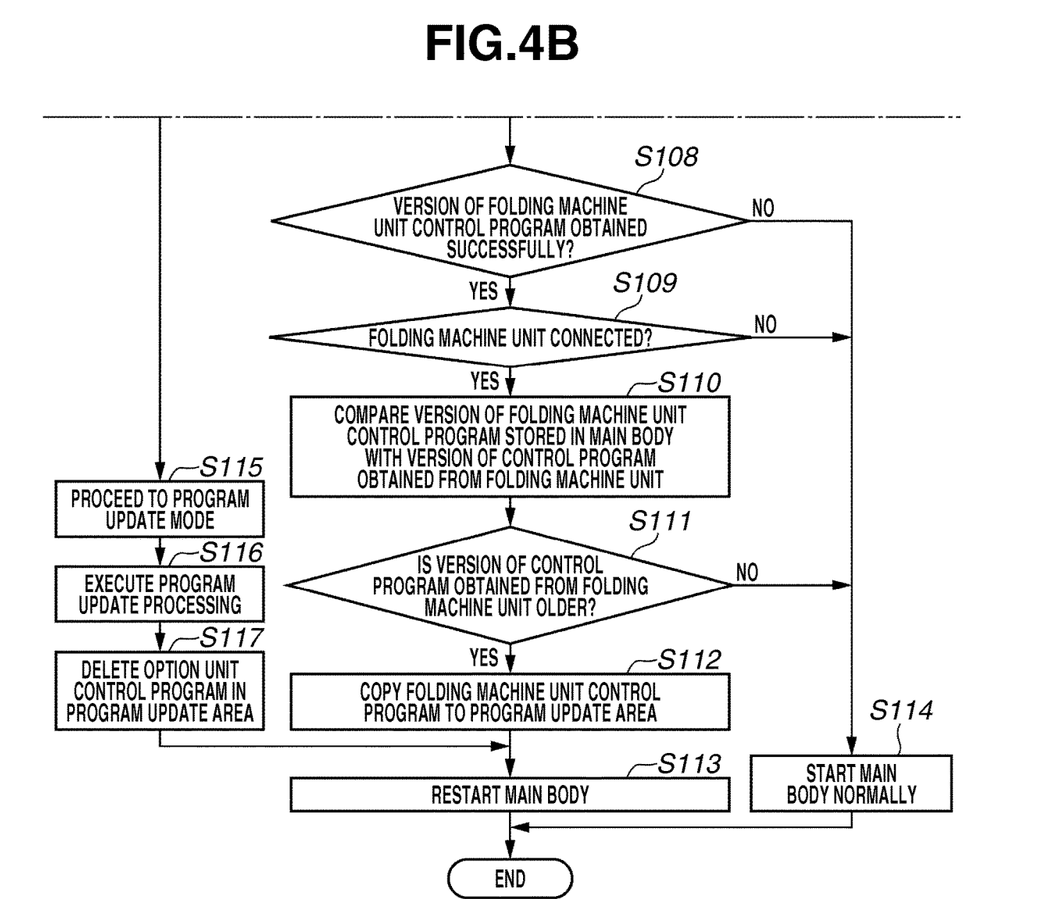

FIG. 4, which is composed of FIGS. 4A and 4B, is a flowchart illustrating an example of update processing of an option unit (facsimile unit, folding machine unit) control program performed by the multifunction peripheral 10.

When the main power of the multifunction peripheral 10 main body is turned on, the CPU 101 executes the following processing based on the main body control program. First, in step S101, the CPU 101 starts the main body of the multifunction peripheral 10.

In step S102, the CPU 101 determines whether there is an option unit control program in the program update area of the ROM 102. If it is determined by the CPU 101 that there is an option unit control program in the program update area of the ROM 102 (YES in step S102), the processing proceeds to step S115. On the other hand, if it is determined by the CPU 101 that there is not an option unit control program in the program update area of the ROM 102 (NO in step S102), the processing proceeds to step S103.

When the processing illustrated in FIG. 4 is first executed, there is no option unit control program in the program update area. Therefore, the determination in step S102 is "NO", and the processing proceeds to step S103. Then, when an option unit control program has been copied to the program update area in the below-described step S107 or step S112, the determination in step S102 will be "YES", so the processing proceeds to step S115. Then, as illustrated in the below-described steps S115 and S116, the option unit control program is updated.

In step S103, the CPU 101 determines whether the facsimile unit 200 that is to be control target of the main body controller unit 100 is connected. If it is determined by the CPU 101 that the facsimile unit 200 is connected (YES in step S103), the processing proceeds to step S104. If it is determined by the CPU 101 that the facsimile unit 200 is not connected (NO in step S103), the processing proceeds to step S108.

In step S104, the CPU 101 sends a command relating to an obtainment request for the version of the control program that is stored in the flash memory 202 in the facsimile unit 200 to the connection destination facsimile unit 200. The CPU 101 then determines based on the response to this command whether the version of the control program of the facsimile unit 200 was successfully obtained. If it is determined by the CPU 101 that the version of the control program of the facsimile unit 200 was successfully obtained (YES in step S104), the processing proceeds to step S105. If it is determined by the CPU 101 that the version of the control program of the facsimile unit 200 was not obtained (NO in step S104), the processing proceeds to step S108.

In step S105, the CPU 101 compares the obtained version with the version of the facsimile unit control program stored in the download area of the ROM 102 of the main body controller unit.

In step S106, based on the comparison result, the CPU 101 determines whether the obtained version is older. If it is determined by the CPU 101 based on the comparison result that the obtained version is older (YES in step S106), the processing proceeds to step S107. If it is determined that the obtained version is not older (NO in step S106), the processing proceeds to step S108.

In step S107, the CPU 101 copies the facsimile unit control program stored in the download area to the program update area of the ROM 102. More specifically, the CPU 101 copies the latest facsimile unit control program included in the main body control program stored in the download area to the program update area of the ROM 102.

In step S108, the CPU 101 determines whether the folding machine unit 300 that is to be control target of the main body controller unit 100 is connected. If it is determined by the CPU 101 that the folding machine unit 300 is connected (YES in step S108), the processing proceeds to step S109. If it is determined by the CPU 101 that the folding machine unit 300 is not connected (NO in step S108), the processing proceeds to step S114.

In step S109, the CPU 101 sends a command relating to an obtainment request for the version of the control program that is stored in the flash memory 302 in the folding machine unit 300 to the connection destination folding machine unit 300. The CPU 101 then determines based on the response to this command whether the version of the control program of the folding machine unit 300 was successfully obtained. If it is determined by the CPU 101 that the version of the control program of the folding machine unit 300 was successfully obtained (YES in step S109), the processing proceeds to step S110. If it is determined by the CPU 101 that the version of the control program of the folding machine unit 300 was not obtained (NO in step S109), the processing proceeds to step S114.

In step S110, the CPU 101 compares the obtained version with the version of the folding machine unit control program stored in the download area of the ROM 102 of the main body controller unit.

In step S111, based on the comparison result, the CPU 101 determines whether the obtained version is older. If it is determined by the CPU 101 based on the comparison result that the obtained version is older (YES in step S111), the processing proceeds to step S112. If it is determined that the obtained version is not older (NO in step S111), the processing proceeds to step S114.

In step S112, the CPU 101 copies the folding machine unit control program stored in the download area to the program update area of the ROM 102. More specifically, the CPU 101 copies the latest folding machine unit control program included in the main body control program stored in the download area to the program update area of the ROM 102.

In step S113, the CPU 101 restarts the main body of the multifunction peripheral 10.

On the other hand, in step S114, the CPU 101 starts the main body of the multifunction peripheral 10 as normal.

Further, on the other hand, in step S115, the CPU 101 proceeds to a program update mode.

In step S116, the CPU 101 executes program update processing. For example, if there is the latest facsimile unit control program in the program update area, the CPU 101 executes processing to update the facsimile unit control program stored in the flash memory 202 of the facsimile unit 200 with the latest facsimile unit control program. Further, for example, if there is the latest folding machine unit control program in the program update area, the CPU 101 executes processing to update the folding machine unit control program stored in the flash memory 302 of the folding machine unit 300 with the latest folding machine unit control program.

In step S117, the CPU 101 deletes the option unit control programs in the program update area.

A second exemplary embodiment will now be described.

In the first exemplary embodiment, description is made such that the CPU 101 obtains from the server and stores a main body control program including the latest control programs of all the option units that can be connected to the main body controller unit 100.

However, storing a main body control program that includes the latest control programs of all the option units that can be connected wastes memory.

Figure 5:
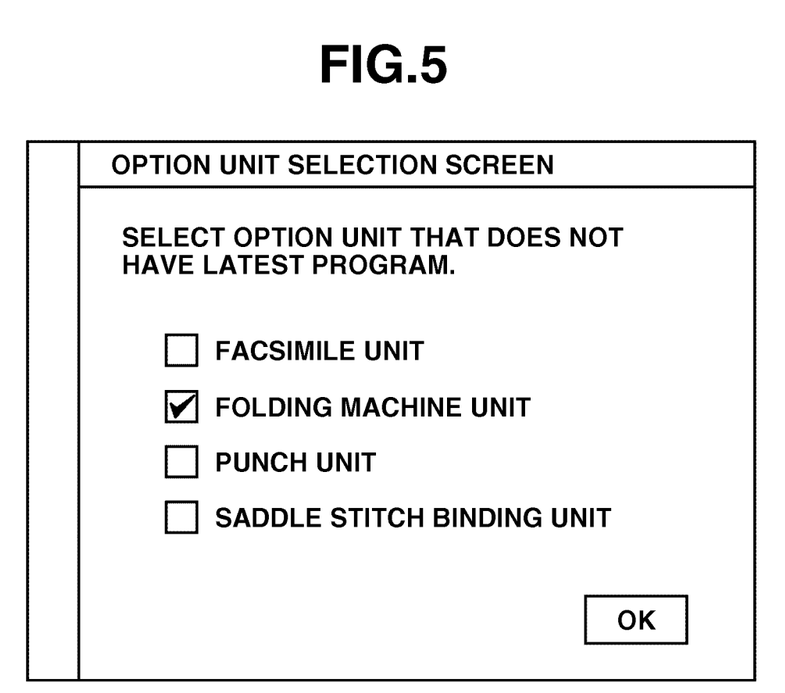
FIG. 5 illustrates an example of an option unit selection screen.

Therefore, when the CPU 101 according to the present exemplary embodiment detects a predetermined operation, the CPU 101 displays the option unit selection screen illustrated in FIG. 5 on the operation unit 107. FIG. 5 illustrates an example of an option unit selection screen. The user selects on an option unit selection screen like that illustrated in FIG. 5 an option unit that does not have the latest program, and then selects the OK button. Based on this operation, an option unit that does not have the latest program can be selected. The CPU 101 sets the option unit selected on the option unit selection screen as an option unit that does not have the latest program, and stores the setting information in the ROM 102.

Based on this setting information, the CPU 101 may obtain from the server a main body control program that includes only the latest option unit control programs that the user needs. Specifically, based on the setting information, the CPU 101 may obtain from the server a main body control program that includes the option units other than the option units set as option units that do not have the latest program. Further, the CPU 101 may once obtain the main body control program similar to the first exemplary embodiment from the server, and based on the setting information, delete the option unit control programs that are not necessary from the main bode control program, and then save the resultant main body control program.

Figure 6:
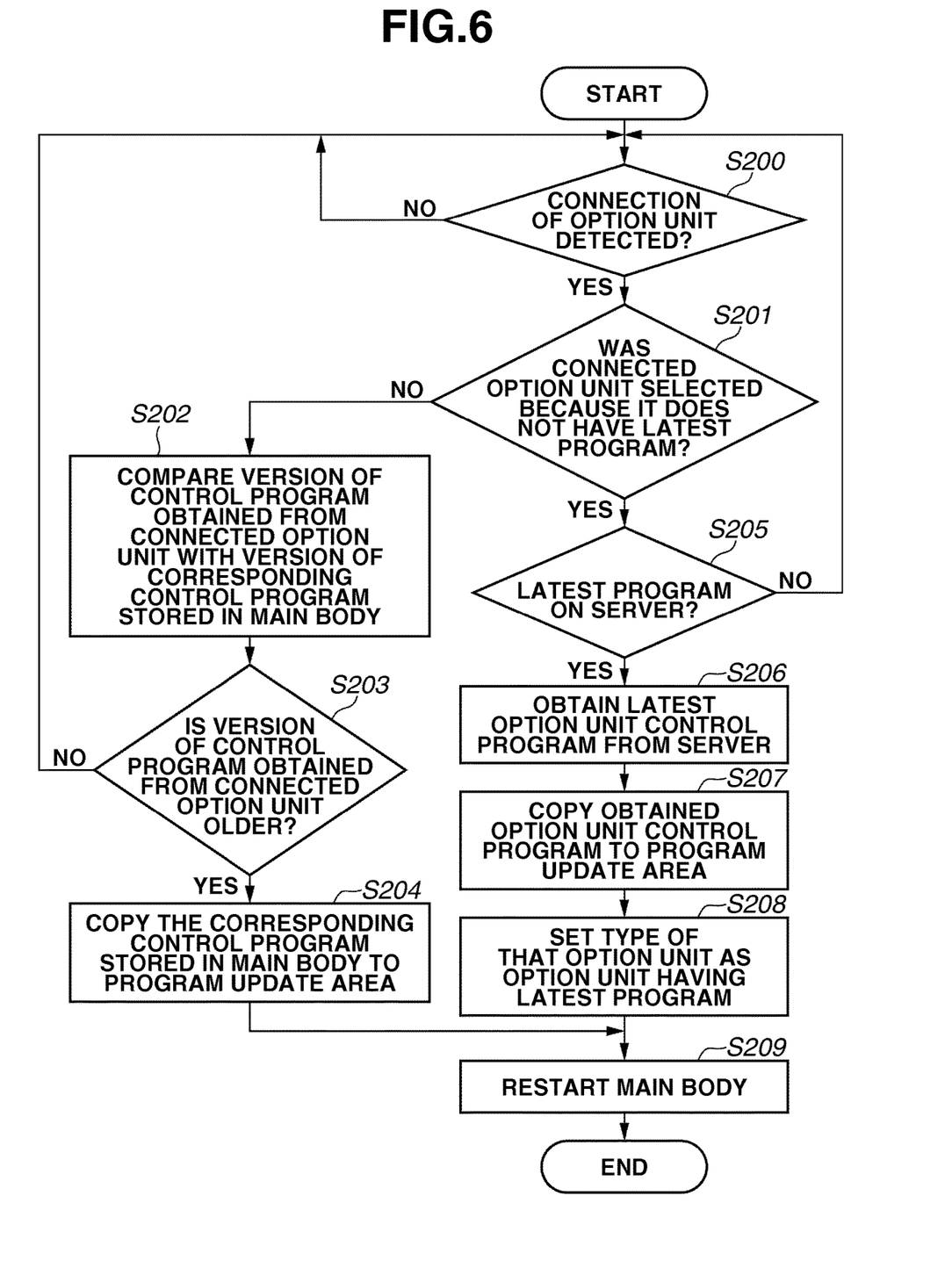
FIG. 6 is a flowchart illustrating an example of update processing of an option unit control program performed in a multifunction peripheral when connection of an option unit has been detected.

FIG. 6 is a flowchart illustrating an example of update processing of an option unit control program performed by the multifunction peripheral 10 when connection of an object unit has been detected.

In step S200, the CPU 101 determines whether connection of an option unit to the main body controller unit 100 has been detected. If it is determined by the CPU 101 that connection of an option unit has been detected (YES in step S200), the processing proceeds to step S201. If it is determined by the CPU 101 that connection of an option unit has not been detected (NO in step S200), the processing repeats the processing of step S200.

In step S201, the CPU 101 determines based on the setting information whether the option unit for which a connection was detected is an option unit that is set as not having the latest program. If it is determined by the CPU 101 that the option unit for which a connection was detected is an option unit that is set as not having the latest program (YES in step S201), the processing proceeds to step S205. On the other hand, if it is determined by the CPU 101 that the option unit for which a connection was detected is an option unit that is not set as not having the latest program (NO in step S201), the processing proceeds to step S202.

In step S202, the CPU 101 compares the version of the option unit control program obtained from the option unit for which a connection was detected with the version of the option unit control program stored in the download area of the ROM 102 of the main body controller unit.

In step S203, based on the comparison result, the CPU 101 determines whether the version obtained from the option unit is older. If it is determined by the CPU 101 based on the comparison result that the version obtained from the option unit is older (YES in step S203), the processing proceeds to step S204. However, if it is determined that the version obtained from the option unit is not older (NO in step S203), the processing returns to step S200.

In step S204, the CPU 101 copies the option unit control program stored in the download area to the program update area of the ROM 102.

On the other hand, in step S205, the CPU 101 determines whether the latest control program of the option unit for which a connection was detected is on the server. For example, the CPU 101 obtains the version of the option unit control program from the option unit for which a connection was detected. Further, the CPU 101 sends a command inquiring whether a newer version than that option unit version is present on the server. The CPU 101 may then determine based on the response from the server to this command whether there is a newer version than the option unit version.

If it is determined by the CPU 101 that the latest control program of the option unit for which a connection was detected is on the server (YES in step S205), the processing proceeds to step S206. If it is determined by the CPU 101 that the latest control program of the option unit for which a connection was detected is not on the server (NO in step S205), the processing returns to step S200.

In step S206, the CPU 101 obtains the latest control program of the option unit for which a connection was detected from the server (latest program obtainment). Further, the CPU 101 may obtain only the latest control program of the option unit for which a connection was detected from the server, or may obtain the main body control program in which the latest control program of this option unit is included.

In step S207, the CPU 101 copies the obtained latest control program of the option unit to the program update area (latest program copying).

In step S208, the CPU 101 changes the setting information so that the option unit for which a connection was detected is deleted from the option units that do not have the latest program. Alternatively, the CPU 101 may set the option unit for which a connection was detected as an option unit that has the latest program.

In step S209, the CPU 101 restarts the main body of the multifunction peripheral 10.

Other Embodiments will be described.

The present invention can also be realized by executing following processing. Specifically, the processing is supplying software (a program) for realizing the functions of the above exemplary embodiment to a system or an apparatus via a network or via various storage media, and causing a computer (or a CPU or a micro processing unit (MPU)) of the system or apparatus to read and execute the program.

According to the above exemplary embodiments, when a new option unit is mounted, the option unit programs that match the combination with the main body program can be automatically downloaded. Consequently, the occurrence of problems caused by a mismatch in the program version between the main body and the option unit can be easily prevented. Further, even when an option unit that is common to a plurality of multifunction peripheral models can be used, the control program that is most suited to that model can be automatically updated. Therefore, the work and effort required for this operation or for managing the option units can be reduced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
a printer;
a network interface circuit;
a first connection interface circuit configured to connect a first option unit to the printing apparatus, the first option unit including a memory storing a first option control program;
a second connection interface circuit configured to connect a second option unit to the printing apparatus, the second option unit including a memory storing a second option control program;
a third connection interface circuit configured to connect a third option unit to the printing apparatus;
a storage memory storing a printer control program for controlling an operation of the printing apparatus; and
at least one processor executing instructions causing the printing apparatus to:
provide a screen for receiving a designation for determining at least one option unit that is a target of update program acquisition from among a plurality of option units which can be connected to the printing apparatus;
store, into the storage memory, a printer update program for updating the printer control program, a first option update program for updating the first option control program and a second option update program for updating the second option control program, wherein, among option update programs corresponding to the plurality of option units, only the first option update program and the second option update program corresponding to the received designation have been obtained in advance via the network interface circuit and stored into the storage memory even before at least one of the first and second option units are connected to the printing apparatus;
update the printer control program using the printer update program stored in the storage memory;
detect the first option unit in accordance that the first option unit is connected to the first connection interface circuit;
perform an update process to update the first option control program in the memory of the detected first option unit using the first option update program in a case where the first option update program has been stored in the storage memory;
detect the third option unit included in the plurality of option units in accordance that the third option unit is connected to the third connection interface circuit, wherein, according to the received designation, a third option update program for updating a third option control program of the third option unit is not obtained via the network interface circuit before the third option unit is connected to the printing apparatus, and
determine, in response to a detection of the third option unit, whether there is the third option update program which has a newer version than a version of the third option control program in the memory of the detected third option unit based on a response from a server via the network interface circuit.

2. The printing apparatus according to claim 1, wherein the instructions further cause the printing apparatus to:
obtain a version of the first option control program in the memory of the detected first option unit from the detected first option unit; and
compare a version of the first option update program stored in the storage memory and the version obtained from the detected first option unit,
wherein, in a case where a result of the comparison indicates that the version of the first option update program is newer than the version obtained from the detected first option unit, the update process is performed using the first option update program stored in the storage memory.

3. The printing apparatus according to claim 2, wherein, in a case where the result of the comparison indicates that the version of the first option update program is older than the version obtained from the first option unit, the update process is not performed.

4. The printing apparatus according to claim 1, wherein the storage memory is a read-only memory (ROM).

5. The printing apparatus according to claim 1, wherein the plurality of option units includes at least two to a facsimile unit, a folding machine unit, a punch unit, and a saddle stitch binding unit which performs a finishing process to be performed on sheets printed by the printer.

6. The printing apparatus according to claim 1, wherein the instructions further cause the printing apparatus to:
obtain, according to the determination based on the response from the server, the third option update program via the network interface circuit after the third option unit is connected to the printing apparatus; and
update the control program of the third option using the obtained third option update program.

7. A method for use in a printing apparatus, the printing apparatus connectable to a plurality of option units, each of the option units including a memory, the printing apparatus including a printer, a network interface circuit, a first connection interface circuit configured to connect a first option unit to the printing apparatus, and a storage memory, the method comprising:

connecting, by a first connection interface circuit, a first option unit to the printing apparatus, the first option unit including a memory storing a first option control program;

connecting, by a second connection interface circuit, a second option unit to the printing apparatus, the second option unit including a memory storing a second option control program;

connecting a third option unit to the printing apparatus;

storing, in the storage memory, a printer control program for controlling an operation of the printing apparatus;

providing a screen for receiving a designation for determining at least one option unit that is a target of update program acquisition from among the plurality of option units;

storing, into the storage memory, a printer update program for updating the printer control program, a first option update program for updating the first option control program and a second option update program for updating the second option control program, wherein, among option update programs corresponding to the plurality of option units, only the first option update program and the second option update program corresponding to the received designation have been obtained in advance via the network interface circuit and stored into the storage memory even before at least one of the first and second option units are connected to the printing apparatus;

updating the printer control program using the printer update program stored in the storage memory;

detecting the first option unit in accordance that the first option unit is connected to the first connection interface circuit;

performing an update process to update the first option control program in the memory of the detected first option unit using the first option update program in the first option update program has been stored in the storage memory;

detecting the third option unit included in the plurality of option units in accordance that the third option unit is connected to the third connection interface circuit, wherein, according to the received designation, a third option update program for updating a third option control program of the third option unit is not obtained via the network interface circuit before the third option unit is connected to the printing apparatus, and determining, in response to a detection of the third option unit, whether there is the third option update program which has a newer version than a version of the third option control program in the memory of the detected third option unit based on a response from a server via the network interface circuit.

8. The method according to claim 7, further comprising:

obtaining a version of the first option control program in the memory of the detected first option unit from the detected first option unit; and comparing a version of the first option update program stored in the storage memory and the version obtained from the detected first option unit, wherein, in a case where a result of the comparison indicates that the version of the first option update program is newer than the version obtained from the detected first option unit, the update process is performed using the first option update program stored by the storage memory.

9. The method according to claim 8, wherein, in a case where the result of the comparison indicates that the version of the first option update program is older than the version obtained from the first option unit, the update process is not performed.

10. The method according to claim 7, wherein the storage memory is a read-only memory (ROM).

11. The method according to claim 7, wherein the plurality of option unit includes at least two of a facsimile unit, a folding machine unit, a punch unit, and a saddle stitch binding unit which performs a finishing process to be performed on sheets printed by the printer.

12. The method according to claim 7, further comprising:

receiving a designation for selecting at least one of the plurality of option units, wherein the first option update program and the second option update program are obtained via the network interface circuit based on the designation and is stored in the storage memory before the first option unit or the second option unit are connected to the printing apparatus.

13. The method according to claim 7, further comprising:

obtaining, according to the determination based on the response from the server, the third option update program via the network interface circuit after the third option unit is connected to the printing apparatus; and updating the control program of the third option using the obtained third option update program.

\* \* \* \* \*